United States Patent [19]

Dlugos

[11] 4,135,662
[45] Jan. 23, 1979

[54] OPERATOR PROMPTING SYSTEM
[75] Inventor: Daniel F. Dlugos, Huntington, Conn.
[73] Assignee: Pitney-Bowes, Inc., Stamford, Conn.
[21] Appl. No.: 806,747
[22] Filed: Jun. 15, 1977
[51] Int. Cl.² .................. G06F 11/00; G01G 19/417
[52] U.S. Cl. .................................. 235/304; 177/25; 364/466
[58] Field of Search ............... 235/301, 304; 364/466, 364/710, 900; 177/25; 340/324 A

[56] References Cited

U.S. PATENT DOCUMENTS

| | | | |
|---|---|---|---|
| 3,315,067 | 4/1967 | Bell et al. | 177/25 |
| 3,474,438 | 10/1969 | Lauher | 340/324 A |
| 3,839,630 | 10/1974 | Olander, Jr. et al. | 235/156 |
| 3,906,208 | 9/1975 | Rogers | 177/25 |
| 3,976,975 | 8/1976 | Cochran | 35/9 A |
| 4,004,139 | 1/1977 | Hall | 177/25 |
| 4,051,913 | 10/1977 | Gudea | 177/25 |
| 4,055,748 | 10/1977 | Boshinski et al. | 177/25 |

*Primary Examiner*—Charles E. Atkinson
*Attorney, Agent, or Firm*—Peter Vrahotes; William D. Soltow, Jr.; Albert W. Scribner

[57] ABSTRACT

In a data processing system wherein operator entry of data is provided an array of alpha numeric display units is utilized not only for indicating operand entries and operating results, but also as an operator message prompting medium for steering the operator to correct operand entry or system errors. Upon processor recognition of a particular entry or other errors an assigned error signal is generated which blocks the operand or operation result signal from the display units. In one embodiment the error signal is received at a programable logic array associated with each display unit to provide a signal for accessing a memory which in turn provides the appropriate letter pattern signal for the display unit to spell out an error prompt message. An alternate embodiment provides for serial generation of the letter pattern signals for each display unit and rapid sequential actuation of the display units to spell the prompt message.

14 Claims, 5 Drawing Figures

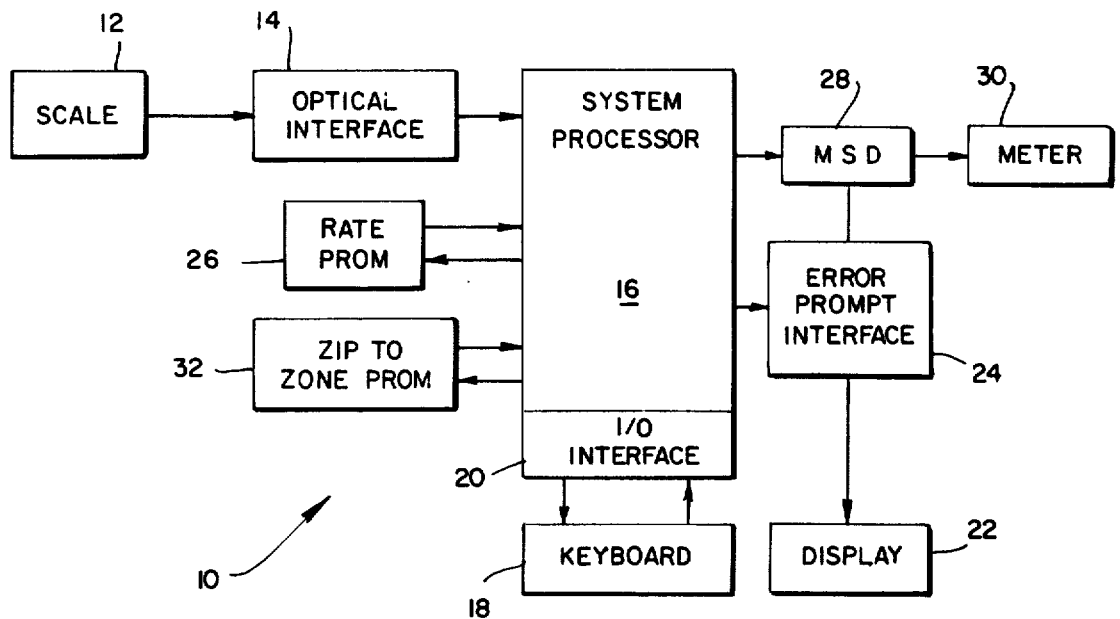

FIG. 3

| INPUT CODE | BINARY CODE | OUTPUT DISPLAY | SEGMENT CODE a b c d e f g dp |
|---|---|---|---|
| 0  | 0 0 0 0 0 | 0 | 0 0 0 0 0 0 1 1 |
| 1  | 0 0 0 0 1 | 1 | 1 0 0 1 1 1 1 1 |
| 2  | 0 0 0 1 0 | 2 | 0 0 1 0 0 1 0 1 |
| 3  | 0 0 0 1 1 | 3 | 0 0 0 0 1 1 0 1 |
| 4  | 0 0 1 0 0 | 4 | 1 0 0 1 1 0 0 1 |
| 5  | 0 0 1 0 1 | 5 | 0 1 0 0 1 0 0 1 |
| 6  | 0 0 1 1 0 | b | 0 1 0 0 0 0 0 1 |
| 7  | 0 0 1 1 1 | 7 | 0 0 0 1 1 1 1 1 |
| 8  | 0 1 0 0 0 | 8 | 0 0 0 0 0 0 0 1 |
| 9  | 0 1 0 0 1 | 9 | 0 0 0 0 1 0 0 1 |
| 10 | 0 1 0 1 0 | A | 0 0 0 1 0 0 0 1 |
| 11 | 0 1 0 1 1 | b | 1 1 0 0 0 0 0 1 |
| 12 | 0 1 1 0 0 | C | 0 1 1 0 0 0 1 1 |
| 13 | 0 1 1 0 1 | d | 1 0 0 0 0 1 0 1 |
| 14 | 0 1 1 1 0 | E | 0 1 1 0 0 0 0 1 |
| 15 | 0 1 1 1 1 | F | 0 1 1 1 0 0 0 1 |
| 16 | 1 0 0 0 0 | G | 0 1 0 0 0 0 1 1 |
| 17 | 1 0 0 0 1 | H | 1 0 0 1 0 0 0 1 |
| 18 | 1 0 0 1 0 | I | 1 0 0 1 1 1 1 1 |
| 19 | 1 0 0 1 1 | J | 1 0 0 0 0 1 1 1 |
| 20 | 1 0 1 0 0 | L | 1 1 1 0 0 0 1 1 |
| 21 | 1 0 1 0 1 | n | 0 0 0 1 0 0 1 1 |
| 22 | 1 0 1 1 0 | O | 0 0 0 0 0 0 1 1 |
| 23 | 1 0 1 1 1 | P | 0 0 1 1 0 0 0 1 |
| 24 | 1 1 0 0 0 | q | 0 0 0 1 1 0 0 1 |
| 25 | 1 1 0 0 1 | r | 0 1 1 1 0 0 1 1 |
| 26 | 1 1 0 1 0 | S | 0 1 0 0 1 0 0 1 |
| 27 | 1 1 0 1 1 | U | 1 0 0 0 0 0 1 1 |
| 28 | 1 1 1 0 0 | y | 1 0 0 0 1 0 0 1 |
| 29 | 1 1 1 0 1 | Z | 0 0 1 0 0 1 0 1 |
| 30 | 1 1 1 1 0 | - | 1 1 1 1 1 1 0 1 |
| 31 | 1 1 1 1 1 | P | 0 0 1 1 0 1 0 1 |

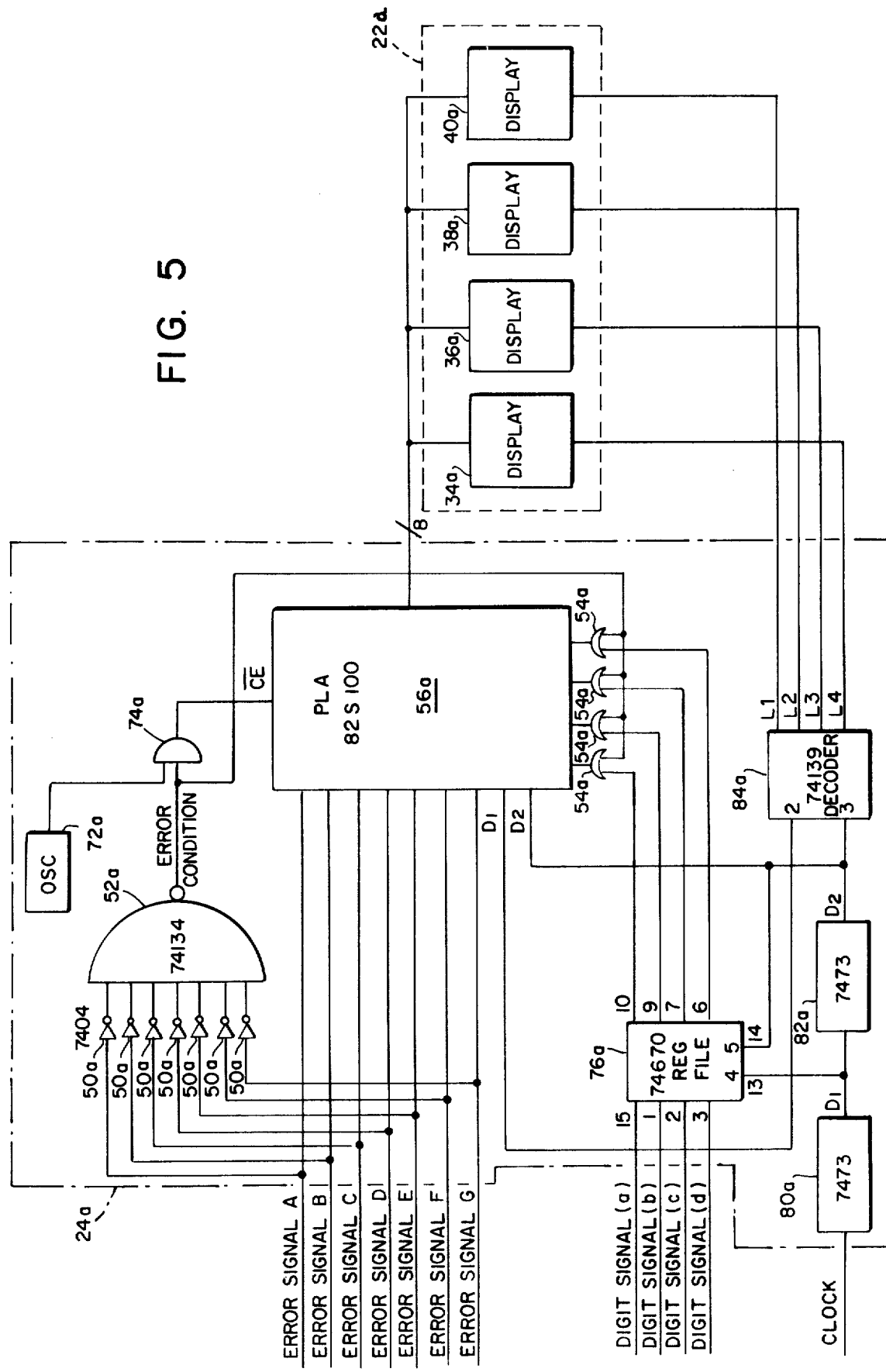

4,135,662

OPERATOR PROMPTING SYSTEM

BACKGROUND OF THE INVENTION

1. Field of the Invention

The invention relates generally to processing systems and more particularly to a system for indicating both numerical data and error prompting information at the same display array.

2. Brief Description of the Prior Art

In data processing systems heretofore, input devices such as keyboards have been utilized in conjunction with associated alpha numeric seven segment display units for observation of operand entry and operation results. Entry errors or errors associated with system conditions were called to the operator's attention through an array of accessory warning lights or other signals, each individually actuated to indicate a particular error or malfunction.

It should be appreciated that with such prior error indicating arrangements the operator's attention extended beyond the display unit array associated with his keyboard to the various system warning indicators. Such indicators therefore provided a source of operator distraction thereby increasing the probability of operator induced errors. Operator distraction has been a significant problem in automated mailing systems wherein an article to be mailed is placed upon a processor associated scale and the operator entered operands necessary for postage determination such as transporation class and destination zone.

SUMMARY OF THE INVENTION

In compendium, the invention relates to an operator prompting system in conjunction with a keyboard station of a processor which utilizes an alpha numeric display array for both indicating numeric data and directing the operator's attention to entry and/or other system errors by specifically spelling a key message indicative of the type of error present thereby leading the operator to complete the operation.

Upon the occurrence of a system or keyboard entry error, the processor generates an associated error signal. The error signal triggers appropriate gates to block numeric data from the display unit array and provides an access signal for location and generation of an appropriate letter pattern signal for each display unit to spell out an error prompting message.

In one embodiment a programable logic array receives the error signal and provides an associated access signal for a memory which produces the letter pattern signal for each display unit to spell out the message. Each display unit of the array is arranged for parallel actuation from its memory; each memory is arranged in parallel with its programable logic array. In an alternate embodiment a single programable logic array is controlled by sequencing signals for successive actuation of each display unit.

From the above compendium, it will be appreciated that it is an object of the present invention to provide an operator prompting system which is not subject to the disadvantages of the prior art as aforementioned.

It is a further object of the present invention to provide an operator prompting system of the general character described which is so constructed as to minimize operator distraction and maintain efficiency.

A still further object of the present invention is to provide an operator prompting system of the general character described wherein an alpha numeric display unit array is utilized to indicate both numeric data and error prompting messages.

Another object of the present invention is to provide a method of operator prompting in a data processing system including a display, which method minimizes operator distraction by routing error prompting messages to the display.

A further object of the present invention is to provide an operator prompting system of the general character described which minimizes the number of processor accessory indicators.

A still further object of the present invention is to provide an operator prompting system of the general character described which directly advises the operator as to the source of possible system error and the manner of correcting same while not presenting any distraction from the operator's data entry routine.

A further object of the present invention is to provide an automated mailing system of the general character described wherein a keyboard operator is apprised of entry or malfunction errors without presenting any distractions from normal routine.

Other objects of the invention in part will be apparent and in part will be pointed out hereinafter.

With these ends in view, the invention finds embodiment in certain combinations of elements, arrangements of parts, and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention:

FIG. 1 is a schematized diagram of a typical automated mailing system utilizing a processor and including an error condition prompting system of the present invention;

FIG. 2 shows a table setting forth typical conditions requiring operator attention in the mailing system, error signals associated with each such condition and corresponding error prompting messages as indicated on a four display unit alpha numeric display for apprising the operator of such error conditions;

FIG. 3 shows a table indicating respective input codes, binary codes, display segment codes, and associated alpha numeric displays for various numbers and letter symbols as utilized in conjunction with the operator prompting system of the present invention;

FIG. 5 is a schematized illustration of a further embodiment of the invention wherein a serial generated error code signal generates an associated error prompting word through sequential actuation of output display units.

DESCRIPTION OF THE PREFERRED EMBODIMENTS

Figure 4:
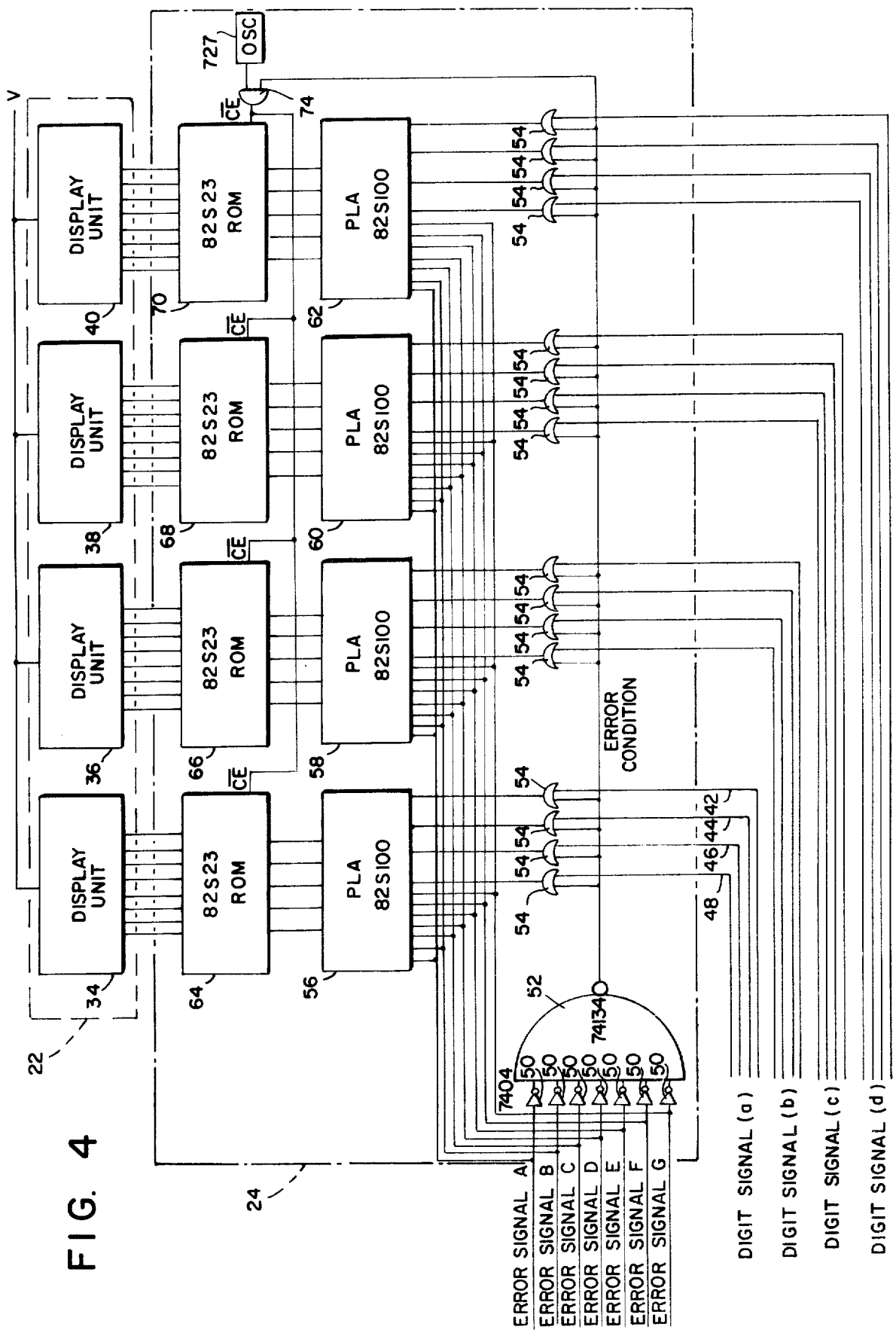
FIG. 4 is a schematized diagram illustrating a typical circuit for indicating prompting words in a display unit array in accordance with the invention.

Referring now in detail to the drawings, the reference numeral 10 denotes an automated mailing system adapted to calculate the postage or other transportation charges required to mail or transport an article. In most instances, transportation charges are based upon the article weight, class of transportation and, with respect to certain classes, distance to destination (zone). The system 10 includes a scale 12 and an optical interface 14 interconnecting the scale with a microprocessor 16. The microprocessor 16 is adapted to compute the requisite postage or other transportation charges for an article placed upon the weighing tray of the scale with the optical interface 14 converting physical weighing tray deflection into processable signals as disclosed, for example, in the mailing system of U.S. Pat. No. 3,861,480.

The data necessary for the determination of article postage, e.g. destination operands, class of transportation operands, etc. are entered at a keyboard 18 and corresponding signals are transmitted to the microprocessor 16 through an input/output interface 20. Keyboard and calculated information is indicated at a proximate display array 22 interconnected to the microprocessor 16 through an error prompt interface 24 constructed in accordance with the instant invention.

With the weight, class of transportation and destination zone operands entered, the microprocessor 16 determines the requisite postage by reference to a rate PROM 26 and provides an appropriate postage amount signal to a meter setting device 28 which controls a meter 30 for the application of postage to the article.

In many instances, the keyboard operator is not aware of the transportation zone for the article but merely has the destination postal zip code. Upon such occurrence, the zip code is entered at the keyboard 18 and the microprocessor 16 determines the appropriate destination zone by reference to a zip to zone PROM 32.

It should be appreciated that as used herein the term "postage" is not to be limited to mail but is intended to include weight and/or destination distance transporation charges by nongovernmental carriers as well.

In the exemplary automated mailing system 10, numerous operator entry errors can be encountered as well as various system errors or malfunctions and, in accordance with the present invention, such errors are immediately called to the keyboard operator's attention by visual indication at the very display array to which the operator's attention is normally directed for indication of keyboard entries.

As mentioned heretofore, during the normal routine of processing mail in the automated mailing system 10 various errors may be encountered. In an exemplary manner FIG. 2 illustrates a chart wherein typical entry and/or system errors have been assigned ERROR SIGNAL designations and an appropriate operator prompting message associated with the error condition is shown.

It should be appreciated that the operator prompting message may appear as a word in the display 22 comprising, by way of example, four or less alphabetical letters each of which is formed by illumination of various segments of a seven segment display unit in accordance with the display segment code as set forth in the table of FIG. 3.

If, for example, the weight of the article placed upon the scale 12 exceeds the scale or system capacity, the microprocessor 16 provides an overweight signal designated ERROR SIGNAL A. The generation of such error signal immediately blocks numerical data from the display 22 and provides an operator prompting message or word, for example the message LbE which would be cognizable to the operator as indicating pounds error—that is, a condition exists wherein the article to be weighed is either beyond the scale capacity or beyond the mailing rate structure capacity. The operator therefore removes the article and clears the system for a subsequent article.

A further error condition requiring operator attention is indicated when either keyboard entry or operation results exceed the four digit capacity which is provided in the display 22 for all possible entries and calculations. Upon a digit overflow the signal ERROR SIGNAL B is generated and the display indicates the prompting message OFLO. Upon observation of this message, the operator clears the system and prepares to recalculate postage.

Another possible error condition in the automated mailing system 10 is the failure of the operator to enter a destination zone for postage calculation. Under the present postal rate structures, a zone entered through the keyboard is a single digit including zero in the least significant digit location. Any other group of digits is detected by the microprocessor 16 as an error when an algorithm button is depressed which requires zone entry. A zone prompt signal designated as ERROR SIGNAL C is produced upon such occurrence and the display 22 indicates the operator prompting message ZONE. A further condition indicative of a zone error would be when zone entry is required and none has been chosen. Upon the depression of the algorithm button requiring zone entry, the lack of such operand may be indicated by the same zone message.

In instances wherein a zip code entry is required and the operator has not made any entry, ERROR SIGNAL D is generated for displaying the message ZIP thereby prompting the operator to make the necessary zip entry.

In instances where a zip to zone conversion is requested, various errors can be encountered. Zip codes which are entered through the keyboard presently comprise three digits including leading zones. If the operator enters any other combination upon request for zip to zone conversion, a zip entry error signal, ERROR SIGNAL E will be generated to indicate the message ZIPE at the display 22. A further condition wherein the zip entry message may be provided is when a zip code is entered to which a destination zone has not been assigned.

A typical system error which may be called to the operator's attention through the present invention occurs in instances when the scale 12 is not providing a true zero no load weight indication, e.g. dust accumulation causes the tare to rest below true zero. In such instances, the microprocessor 16 generates ERROR SIGNAL F and an appropriate operator prompting message such as the word ZERO is provided at the display 22.

In a situation where a code number is required by an algorithm and the operator has not entered such operand, ERROR SIGNAL G is generated and the prompting message word COdE is provided at the display 22.

It should be understood that the error conditions presented are by way of example only and are merely indicative of the type of errors which the prompting system of the present invention is adapted to detect in the data processing environment of the automated mailing system 10.

The error prompting system of the present invention finds useful application in other environments as well wherein it is desirable to utilize alpha numeric display units for both numeric data indications and as an error prompting medium.

In FIG. 4 a typical error prompting interface 24 is illustrated. The interface 24 interconnects the system processor 16 and the display 22 which includes four seven segment display units 34, 36, 38 and 40. When an error condition is not present the interface receives binary coded decimal DIGIT SIGNALS a, b, c and d from the microprocessor and provides appropriate segment code signals for Arabic numeral display corresponding to the BCD code for each of the display units 34, 36, 38 and 40, respectively. The DIGIT SIGNALS for each display unit are parallel loaded through a plurality of input lines; for example input lines 42, 44, 46 and 48 associated with the display unit 34 transmit DIGIT SIGNAL a.

The ERROR SIGNALS A through G appear at separate ERROR SIGNAL lines and are OR gated to provide an ERROR CONDITION signal which is high whenever any of the ERROR SIGNALS is high. As illustrated, error signal OR gating may be achieved through a combination of inverters 50 and a NAND gate 52. The ERROR CONDITION signal which is produced at the NAND 52 gate is used to block incoming digit signals at OR gates 54 provided for each of the incoming DIGIT SIGNALS. Further, the ERROR CONDITION signal is utilized in conjunction with an oscillator to blink the display 22 upon an error condition so as to emphasize the presence of an error.

The high incoming ERROR SIGNAL (A–G) is fed to a programable logic array 56, 58, 60 and 62, each associated with a respective display unit 34, 36, 38 and 40. The logic arrays 56, 58, 60 and 62 accept a BCD coded input on either the DIGIT SIGNAL or the ERROR SIGNAL lines and provides a conversion from the error input code to an access signal for a memory (ROM) 64, 66, 68 and 70 associated with each of the display units 34, 36, 38 and 40, respectively. With respect to DIGIT SIGNALS (a–d) the logic arrays 56, 58, 60 and 62 merely pass the incoming BCD signals through to the associated ROM.

By way of example, assuming that the ERROR SIGNAL A is high, as a result of an overweight condition, such error signal will be converted at the programable logic array 56 into a binary memory access signal associated with the input code no. 20 of the table of FIG. 3 which binary code accesses the memory 64 to provide the seven segment display code for illumination of the segments of the display unit 34 required to indicate the letter "L". Similarly, with ERROR SIGNAL A high the logic array 58 will access the memory 66 to provide the segment code to indicate the letter "b" at the display unit 36 and the logic array 60 will access the memory 68 to provide the segment code to indicate the letter E at the display unit 38, all in accordance with the exemplary binary and segment codes shown in the table of FIG. 3.

As mentioned heretofore, a further feature of this invention is the provision for blinking the display 22 upon the presence of an error condition. For this purpose a low frequency oscillator 72 is provided. The oscillator output is fed to an AND gate 74 along with the ERROR CONDITION signal. With an error condition present and the ERROR CONDITION signal high, the output of the gate 74 will be intermittently high and is fed to a chip enable terminal of each memory 64, 66, 68 and 70 whereby the memory output, i.e. the segment codes is flashed on and off at a low operator observable oscillator rate.

In FIG. 5 an alternate embodiment of the error prompting interface is shown. In this embodiment an interface 24a is disposed between the microprocessor 16 and a display 22a substantially identical to the display 22 heretofore described and comprising four seven-segment display units 34a, 36a, 38a, and 40a, respectively. This embodiment provides for a single programable logic array 56a which receives the ERROR SIGNAL (A–G) at appropriate input terminals. The incoming DIGIT SIGNALS (a–d) corresponding to the BCD code for the display units 34a, 36a, 38a, and 40a, respectively, are each serially generated from the microprocessor 16 along individual input lines to appropriate terminals of a register file 76 comprising two individual two line to four line decoders for storage.

The programable logic array 56a receives either the BCD DIGIT SIGNALS (a–d) or the ERROR SIGNALS (A–G) and converts such signals directly into letter or numeral segment codes which are sequentially pulled to place either numerical data or prompting messages into the display 22a.

To provide for the sequential placement of appropriate segment code signals in the display 22a, a four bit cycle sequencing circuit 78a is provided. The sequencing circuit 78a initially provides two sequencing signals $D_1$ and $D_2$ which are generated at a pair of dual J-K master slave flip-flops 80a and 82a. The first flip-flop 80a is driven by a CLOCK signal and provides as its output the first sequencing signal $D_1$ which drives the second flip-flop 82a to produce the second sequencing signal $D_2$.

The sequencing signals $D_1$ and $D_2$ are ransmitted to the register file 76a to sequence the output of BCD digit signals in a four bit cycle pattern. Further, the sequencing signals $D_1$ and $D_2$ are transmitted to the programable logic array 56a to control the sequencing of the seven segment code signals transmitted from the programable logic array.

In order to coordinate the transmission of segment code signals from the logic array 56a to the display 22a, the sequencing circuit 78a includes a decoder 84a which receives the sequencing signals $D_1$ and $D_2$ and provides coordinated four bit cycle display sequencing strobe signals along a plurality of output lines $L_1$, $L_2$, $L_3$, and $L_4$, each controlling a respective display unit 40a, 38a, 36a, and 34a. The sequencing strobe signals are provided at a fast rate such as commonly utilized in multiplexing of displays.

By way of example, the sequencing signal four bit cycle for display indication may follow the following sequencing pattern:

| | | |
|---|---|---|
| $D_1\downarrow$ | $D_2\downarrow$ | display unit 40a actuated |
| $D_1\downarrow$ | $D_2\uparrow$ | display unit 38a actuated |
| $D_1\uparrow$ | $D_2\downarrow$ | display unit 36a actuated |
| $D_1\uparrow$ | $D_2\uparrow$ | display unit 34a actuated |

In a manner identical to that previously described with respect to the first embodiment upon the occurrence of an error condition the display indication may be caused to blink at an operator observable rate by the provision of an inverter 50a inverting each ERROR SIGNAL (A–G) before a NAND gate 52a to provide an ERROR CONDITION signal which is transmitted to an AND gate 74a along with a low frequency oscillating signal of an oscillator 72a. The signal from the AND gate is transmitted to a chip enable terminal of the logic array 56a to thereby disable the logic array, hence disable the display unit at the operator observable oscillator rate to emphasize the presence of the error condition. The ERROR CONDITION signal may be used to control a plurality or OR gates 54a which thereby block the BCD digit signals from the logic array 56a in the event of an error condition in a manner identical to that of the previous embodiment.

It should be understood that the present invention is directed to a system and method of prompting a keyboard operator to the existence of the error condition through utilization of a conventional display array which is normally utilized to indicate data entry of other (numerical) data.

While two possible exemplary circuitry embodiments of the invention have been shown, it should be understood that manifold variations are possible within the spirit of the invention; for example, the microprocessor 60 may very well be adapted to provide the error prompting message segment code signals directly, without utilization of the specific exemplary circuits shown.

Thus, it will be seen that there is provided an error prompting system which achieves the various objects of the invention and which is well suited to meet the conditions of practical use.

Since various possible embodiments might be made of the present invention and since various changes might be made in the exemplary embodiments shown, it is to be understood that all matter herein described or shown in the accompanying drawings is to be interpreted as illustrative and not in a limiting sense.

Having thus described the invention there is claimed as new and desired to be secured by Letters Patent:

1. In a processing system comprising a data processor, operator input means operatively connected to the processor for transmitting data to the processor and display means operatively connected to the processor for visually indicating numeric data, the processor receiving data from the operator input means and processing the received data to provide numeric display signals, the display means receiving the numeric display signals and in response thereto visually indicating corresponding numeric data and with a plurality of possible error conditions existing in conjunction with the processor, the improvement comprising an operator prompting system, the processor including means for detecting an error condition and providing an error signal indicative of the presence of such condition, the prompting system including generating means for receiving the error signal and in response thereto generating a message signal, the display means including means receiving the message signal and in response thereto visually indicating the nature of the error condition as an alphabetically spelled phonetic operator prompt message, the prompting system further including means for receiving the error signal and in response thereto preventing the numeric display data signals from being received by the display means, whereby the operator is apprised of the nature and existence of the particular error condition without distraction of attention from the normal data entry routine.

2. An operator prompting system constructed in accordance with claim 1 further including error emphasis means, the emphasis means receiving the error signal and in response thereto providing a display control signal oscillating at an operator observable rate whereby the operator prompt message is intermittently blinked at the display to emphasize the presence of an error condition.

3. An operator prompting system constructed in accordance with claim 1 wherein the means generating the message signal receives one of a plurality of error signals, each error signal being correlated to a particular error condition, the generating means generating one of a plurality of message signals corresponding to the one error signal, the display means alphabetically spelling a phonetic operator prompt message corresponding to each message signal received.

4. An operator prompting system constructed in accordance with claim 3 wherein the display means comprises a plurality of display units, each message signal comprising a plurality of segment signals corresponding to alphabetic letters, each of the segment signals being received at a different display unit, the display units conjunctively spelling the phonetic prompt message.

5. An operator prompting system constructed in accordance with claim 4 wherein the means generating message signals includes a plurality of means storing the message signals, each storing means generating segment signals associated with a different display unit.

6. An operator prompting system constructed in accordance with claim 5 wherein the storing means further includes a logic array, the logic array receiving a particular error signal and in response thereto providing a corresponding access signal, the memory receiving the access signal and in response thereto generating the message signal.

7. An operator prompting system constructed in accordance with claim 4 wherein the segment signals are transmitted serially, the system further including sequencing means for providing control signals, the generating means receiving the control signals and in response thereto generating the segment signals.

8. An operator prompting system constructed in accordance with claim 7 wherein the generating means includes a logic array for storing the message signals.

9. An operator prompting system constructed in accordance with claim 2 wherein the emphasis means includes oscillating means and gate means, the oscillating means providing a signal oscillating at the operator observable rate, the gate means receiving the oscillating signal and the error signal and in response thereto providing the display control signal.

10. A method of advising an operator of the presence of one of a plurality of possible error conditions in an automated mailing system including input means for entering mailing data signals, processing means receiving the mailing data signals and a display for providing a visual indication of numeric data, the method comprising the steps of
   (a) storing a plurality of error identification data,
   (b) detecting the presence of a particular error condition,
   (c) preventing numeric data from being indicated at the display upon detection of such error condition,
   (d) retrieving error identification data corresponding to the error condition detected from the stored identification data, and
   (e) utilizing the retrieved error condition identification data, actuating the display to alphabetically spell a phonetic operator informative message for correction of the detected error condition.
   whereby the operator is directed to rectify the error condition without any distraction of attention from the display.

11. A method of advising an operator of the presence of an error condition in a data processing system as set forth in claim 10 further including the step of blinking the message at an operator observable rate to thereby emphasize the presence of the error condition.

12. In an automated mailing system including input means for entering mailing data signals requisite for the calculation of postage for an article, display means for providing a visual indication of numeric data and processing means receiving the mailing data signals, the processing means including memory means adapted to store postage rate data, the processing means calculating the requisite postage for the article as a function of the mailing data signals and the postage rate data, the processing means being operatively connected to the display means and transmitting numeric display data signals to the display means, the display means visually indicating numeric values in response to the numeric display data signals and with a plurality of possible error conditions existing in conjunction with the processing of inappropriate mailing data signals, the improvement comprising an operator prompting system, the processing means including means for detecting any of a plurality of possible error conditions and providing an error signal indicative of the presence of the detected error condition, the prompting system including generating means for receiving the error signal correlated to the particular error condition detected, the generating means generating a message signal corresponding to the particular error signal received, the display means receiving the message signal and in response thereto alphabetically spelling a phonetic operator prompt message corresponding to the message signal received, the prompting system further including means for receiving the error signal and in response thereto inhibiting the display of numeric values by the display means, whereby the operator is apprised of the nature and existence of a particular error condition without distraction of attention from the normal mailing system data entry routine.

13. An automated mailing system as constructed in accordance with claim 12 wherein the input means includes means for operator entry of postage rate accessing data.

14. An automated mailing system as constructed in accordance with claim 13 wherein the mailing data includes article weight data, the input means including scale means for weighing the article and generating a weight indicative signal, the mailing data signals including the weight indicative signal.

* * * * *

UNITED STATES PATENT AND TRADEMARK OFFICE
CERTIFICATE OF CORRECTION

PATENT NO. : 4,135,662
DATED : Jan. 23, 1979
INVENTOR(S) : Daniel F. Dlugos

It is certified that error appears in the above—identified patent and that said Letters Patent is hereby corrected as shown below:

Column 6, line 34, change "ransmitted" to -- transmitted --.

Column 8, line 65, change "." to -- , --.

Signed and Sealed this

Twenty-ninth Day of December 1981

[SEAL]

Attest:

GERALD J. MOSSINGHOFF

Attesting Officer    Commissioner of Patents and Trademarks